United States Patent [19]

Tanahashi

[11] Patent Number: 4,625,834
[45] Date of Patent: Dec. 2, 1986

[54] SPEED CONTROL APPARATUS FOR ELEVATOR
[75] Inventor: Tooru Tanahashi, Gifu, Japan
[73] Assignee: Mitsubishi Denki Kabushiki Kaisha, Tokyo, Japan
[21] Appl. No.: 705,698
[22] Filed: Feb. 26, 1985
[30] Foreign Application Priority Data Feb. 29, 1984 [JP] Japan .................................. 59-38213

[51] Int. Cl.$^4$ ............................................... B66B 1/30
[52] U.S. Cl. .................................. 187/29 R; 318/807
[58] Field of Search .................. 187/29; 318/799, 800, 318/801, 807, 809

[56] References Cited

U.S. PATENT DOCUMENTS

| | | | |
|---|---|---|---|
| 4,320,332 | 3/1982 | Sugimoto | 318/807 X |
| 4,446,946 | 5/1984 | Kajiyama et al. | 187/29 R |
| 4,484,129 | 11/1984 | Ono | 318/807 |
| 4,501,343 | 2/1985 | Salihi | 187/29 R |
| 4,519,479 | 5/1985 | Tanahashi | 187/29 R |

Primary Examiner—B. Dobeck
Assistant Examiner—W. E. Duncanson, Jr.
Attorney, Agent, or Firm—Leydig, Voit & Mayer, Ltd.

[57] ABSTRACT

In an elevator speed control apparatus wherein an output signal of a speed detector is sampled at a predetermined interval, and an output signal obtained by processing the sampling is applied to an inverter so as to perform a slip frequency control of an induction motor; correction means to receive the speed detector output signal sampled at the predetermined interval, to differentiate it to generate a differential signal and to deliver the differential signal as a correction signal is provided, so that a magnitude by which a rotational speed of the induction motor changes after the output signal of the speed detector has been fed into a microcomputer until the control signal is applied to the inverter is corrected, whereupon the signal for the speed control is delivered to the inverter, thereby to correct the lag of speed detection attributed to the sampling control.

5 Claims, 9 Drawing Figures (a)

(b)

(c)

SPEED CONTROL APPARATUS FOR ELEVATOR

BACKGROUND OF THE INVENTION

This invention relates to a speed control apparatus for an elevator, and more particularly to an elevator speed control apparatus of the type wherein an inverter is employed for the speed control of a hoisting induction motor and wherein the inverter is controlled by such processing means as a microcomputer.

Heretofore, a speed control apparatus for an elevator shown in FIG. 1 has been proposed as one of the type wherein an inverter is employed for the speed controller of a hoisting induction motor and wherein the inverter is controlled by processing means (as which a microcomputer shall be exemplified hereinafter). Referring to FIG. 1, numeral 1 designates a three-phase A.C. power supply, numeral 2 a converter which converts three-phase alternating current into direct current, numeral 3 a smoothing capacitor which is connected to the D.C. side of the converter 2 and smooths the D.C. output, and numeral 4 an inverter which is connected across the terminals of the smoothing capacitor 3 and inverts the direct current into alternating current of variable voltage and variable frequency in accordance with the pulse width modulation system (hereinbelow, abbreviated to 'PWM') and which is constructed of transistors and diodes. Numeral 5 indicates a current detector which detects the output current of the inverter 4, and numeral 6 a three-phase induction motor which is driven by the A.C. output of the inverter 4 and to which a speed detector, e.g., tachometer generator 7 and a sheave 8 are directly coupled. Shown at numeral 9 is a traction rope which is wound round the sheave 8, and which has the cage 10 of the elevator coupled to one end thereof and the counterweight 11 coupled to the other end thereof.

Numeral 12 indicates a pattern generator which generates the speed pattern of the elevator, and numeral 13 a microcomputer which is fed with the output signal 7a of the speed detector 7 at a predetermined time interval, which operates it in comparison with the output signal 12a of the speed pattern generator 12 and which controls the inverter 4 with the operated output. This microcomputer 13 is composed of a central processing unit (CPU) 16 as well as interface circuits 14 and 15 for feeding the output signals of the speed pattern generator 12 and the speed detector 7 to the central processing unit 16 respectively, a memory device 17 in the form of a RAM and a memory device 18 in the form of a ROM for exchanging data with the central processing unit 16, and interface circuits 19 and 20 for sending a current command generating circuit 21 data etc. processed by the central processing unit 16. In addition, numeral 22 indicates a pulse width modulation circuit (hereinbelow, termed 'PWM circuit') which compares an output signal from the current command generating circuit 21 with the output signal of the current detector 5 and applies pulse width modulation, and numeral 23 a base drive circuit which amplifies the output signal of the PWM circuit 22 so as to apply base signals to the transistors of the inverter 4.

FIG. 2 is a block diagram showing the details of the current command generating circuit 21 in FIG. 1. This circuit comprises a D/A converter 24 which converts into an analog quantity a current command value (digital quantity) 19a sent from the microcomputer 13 through the interface circuit 19, an oscillator 25 which converts into a train of pulses a frequency command 20a sent from the microcomputer 13 through the interface circuit 20, as well as a counter 26 which counts the output pulses of the oscillator 25, and memory circuits 27, 28 and 29 which provide data of sinusoidal waves of different phases and corresponding to phase U, V and W in accordance with the count value of the counter 26, respectively. The output data of the respective memory circuits 27–29 are delivered to corresponding D/A converters 30, 31 and 32. The respective D/A converters 30–32 convert the output data of the memory devices 27–29 into analog quantities with the current command value of the D/A converter 24 as a reference value, to send the current command values of the U, V and W phases.

FIG. 3 shows a functional block diagram expressive of a speed control calculation unit owing to the microcomputer 13. The output signal 7a of the speed detector 7 is subtracted from the pattern signal 12a of the speed pattern generator 12 by a subtracter 131, and the output signal of the difference is subjected to a PI control operation by a PI control calculation portion 132 so as to provide a torque command ($T_L$) 132a. A current calculation portion 133 calculates the current command value I on the basis of the torque command 132a in accordance with Eq. (1) mentioned below, and the current command value I is output as indicated by symbol 19a through the interface circuit 19 (FIG. 1).

$$I = I_o \sqrt{1 + (K_T T_L)^2} \tag{1}$$

where $I_o$: exciting current, $K_T$: coefficient of a torque current, which is determined depending upon the motor.

A slip frequency calculation portion 134 calculates a slip frequency $\omega_s$ on the basis of the torque command $T_L$ in accordance with the following equation (2):

$$\omega_s = K_s T_L \tag{2}$$

where $K_s$: coefficient of a slip frequency, which is determined depending upon the motor.

The output signal obtained by the calculation in the slip frequency calculation portion 134 is added with the output signal 7a of the speed detector 7 in an adder 135, and the result is output as the frequency command 20a.

FIGS. 4(a) and 4(b) illustrate the relationship between the speed and slip frequency of the induction motor during the acceleration of the induction motor. A solid line 40 in FIG. 4(a) represents the actual rotational frequency of the induction motor, a broken line 41 the output signal of the speed detector 7 which is loaded into the microcomputer 13 through the interface circuit 15 at a fixed period, and a dot-and-dash line 42 the output status of the frequency command value 20a.

Meanwhile, when the operations are executed at fixed cycles by the speed control calculation unit shown in FIG. 3, the actual slip frequency fails to agree with the computed value as the rotational frequency of the induction motor changes. This situation is depicted in FIG. 4(b).

In FIG. 4(b), a solid line 43 represents the output status of the slip frequency calculation portion 134, and a dot-and-dash line 44 the actual slip frequency. As apparent from FIG. 4(b), the actual slip frequency (average value) becomes smaller than the output of the slip frequency calculation portion 134. This produces the overvoltage of the induction motor. In the mode of regenerative braking, the actual slip frequency becomes greater relative to the above, resulting in an increase of the current of the induction motor.

SUMMARY OF THE INVENTION

This invention is intended to solve the problem stated above, and has for its object to provide a speed control apparatus for an elevator wherein the magnitude by which the rotational speed of the induction motor changes in the period of time till the application of the control signal to the inverter from the moment at which the output signal of the speed detector 7 is fed into the microcomputer is corrected, thereby to bring the actual slip frequency and the computed value into agreement and to prevent the overvoltage or torque-off of the motor from occurring.

PREFERRED EMBODIMENT OF THE INVENTION

Now, an embodiment of this invention will be described with reference to the drawings.

Figure 1:
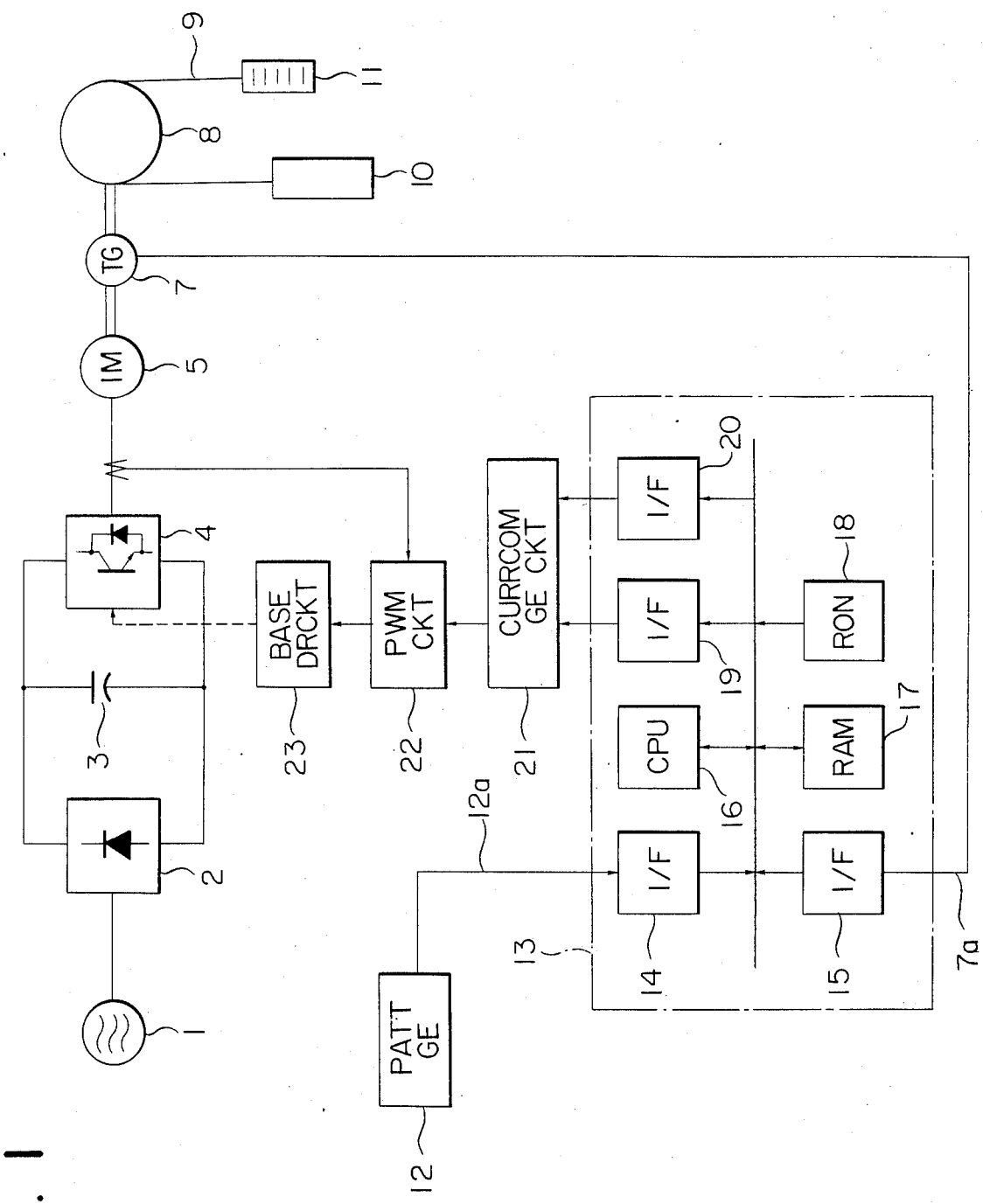
FIG. 1 is a block diagram schematically showing elevator speed control apparatuses in a prior art and according to this invention.
Figure 2:
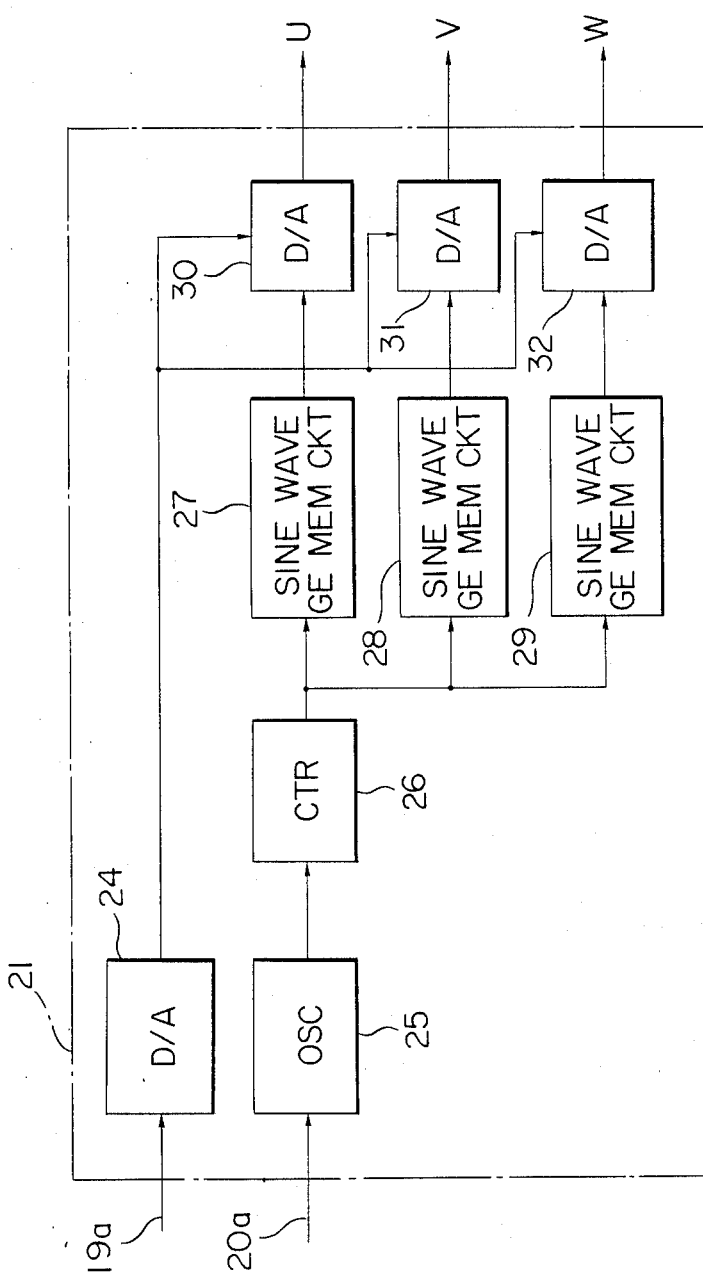
FIG. 2 is a block diagram showing the details of a current command generating circuit in FIG. 1.
Figure 5:
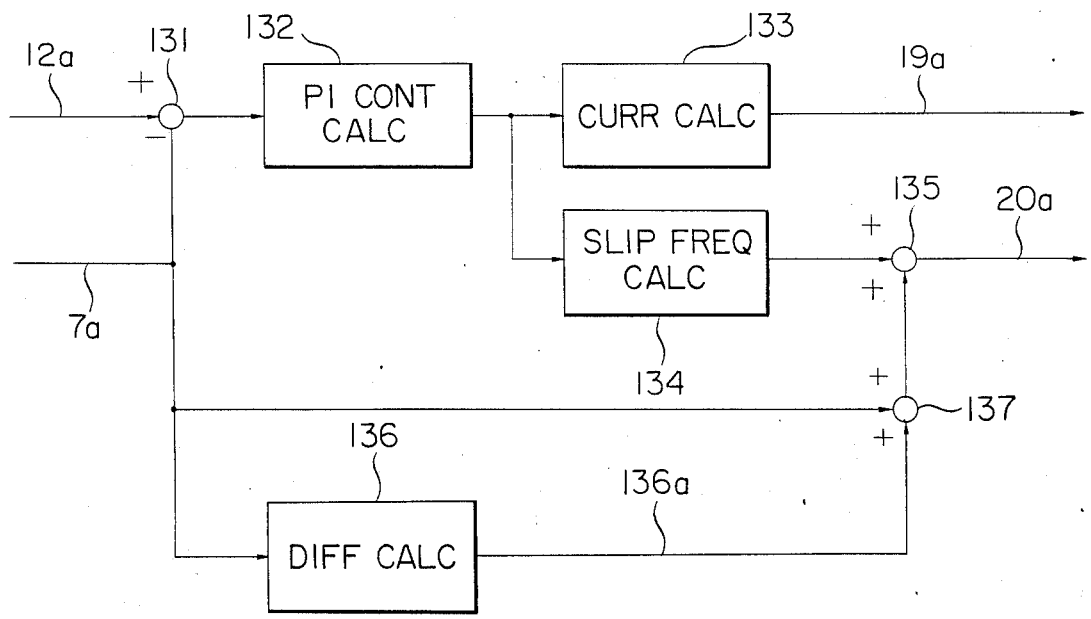
FIG. 5 is a functional block diagram of a speed control calculation unit in this invention.

The general arrangement of the elevator speed control apparatus according to this invention is similar to the arrangement shown in FIGS. 1 and 2. As illustrated in FIG. 5, this invention especially furnishes the speed control calculation unit with a differential calculation portion in order to correct a speed detection lag ascribable to the sampling control thereby to bring the actual slip frequency and the computed value into agreement. FIG. 5 corresponds to FIG. 3.

Figure 3:
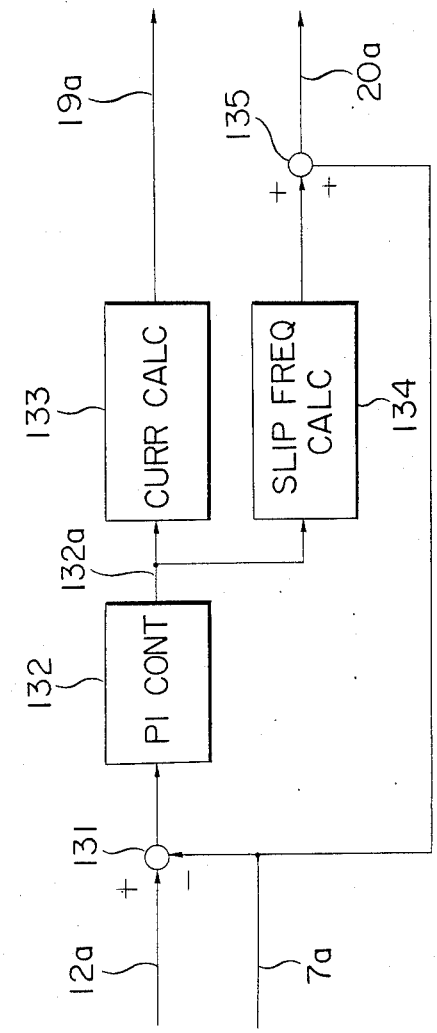
FIG. 3 is a functional block diagram of a speed control calculation unit in the prior art.
Figure 4:
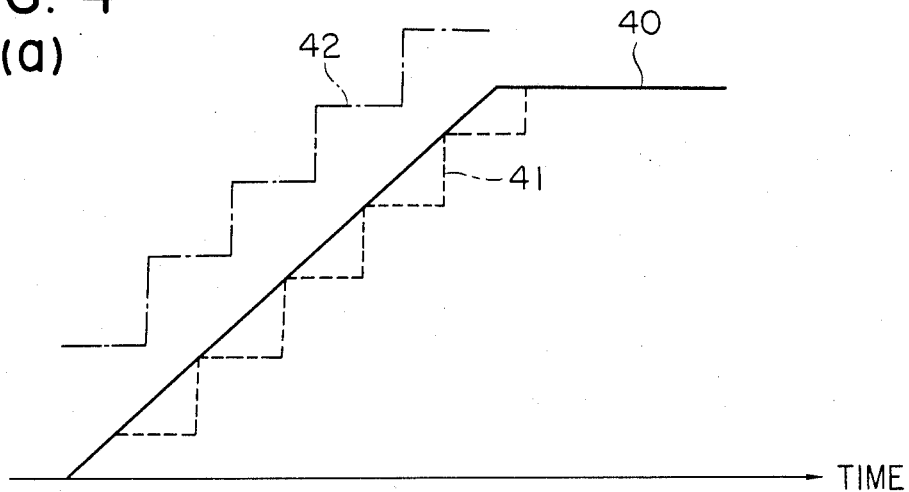
FIGS. 4(a) and 4(b) are explanatory waveform diagrams showing the relationship between the slip frequency and the speed of a motor in the prior art.

The same portions as in FIG. 3 are assigned the same symbols in FIG. 5, and shall be omitted from the description. Portions different from those in FIG. 3 shall be stated explicitly.

As understood by comparing FIG. 5 with FIG. 3, the portions indicated by numerals 131-135 are the same as those in FIG. 3, and the portions indicated by numerals 136 and 137 are added anew in this invention and form the feature of this embodiment. More specifically, numeral 136 designates a differential calculation portion, which differentiates the output signal 7a of the speed detector 7, and the differential output signal 136a of which is delivered to an adder 137. The adder 137 finds the sum between the differential output signal 136a and the output signal 7a of the speed detector 7. The signal of the sum obtained by the adder 137 is delivered to the adder 135 and is added with the output signal from the slip frequency calculation portion 134, and the result is output as the frequency command 20.

By disposing the differential calculation portion 136 and the adder 137 anew in this manner, the manitude by which the rotational speed of the induction motor 6 changes after the output signal of the speed detector 7 has been fed into the microcomputer 13 until the control signal for varying the frequency is applied to the inverter 4 is corrected, whereupon the control signal is delivered to the inverter 4.

Figure 6:
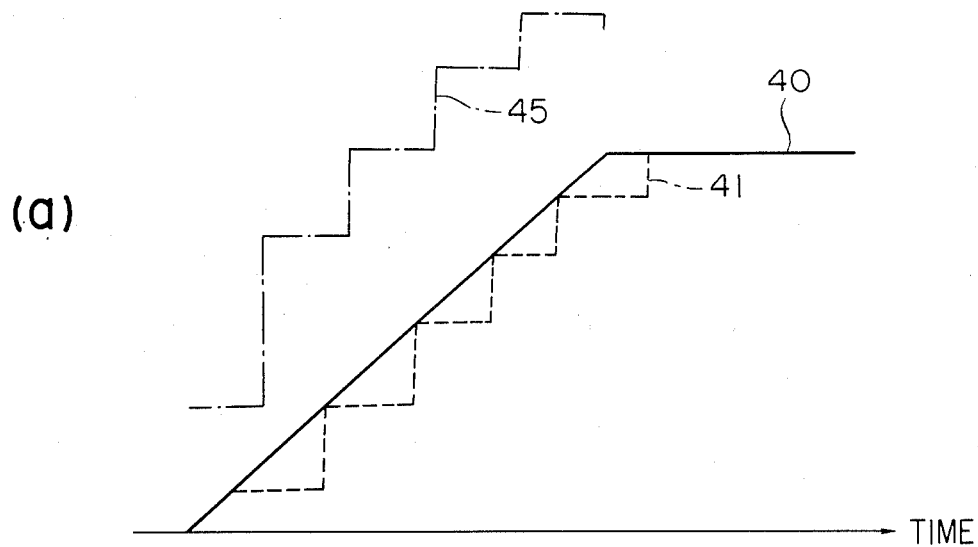
FIGS. 6(a) to 6(c) are explanatory waveform diagrams showing the relationship between the slip frequency and the speed of a motor in this invention.
Figure 6:
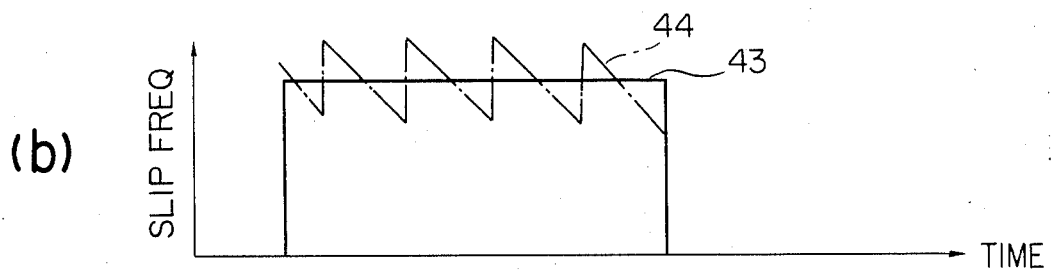
Figure 6:
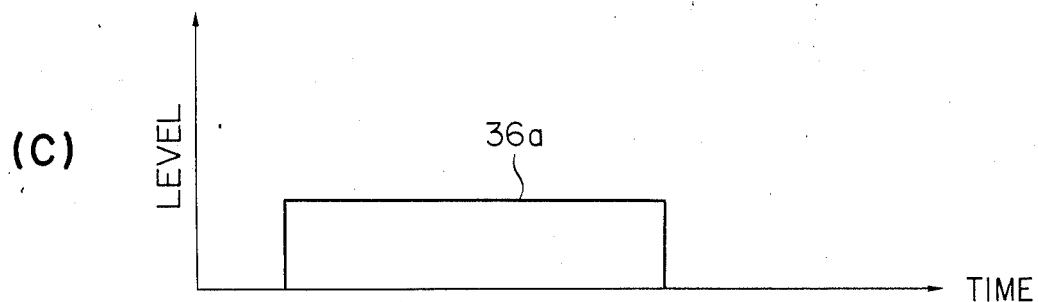

FIGS. 6(a)–6(c) illustrate the relationship between the slip frequency and the speed during the acceleration of the motor as based on this invention. A solid line 40 in FIG. 6(a) represents the actual rotational frequency of the motor, a broken line 41 the output signal of the speed detector 7 which is sampled by the microcomputer 13, and a dot-and-dash line 45 the frequency command value 20.

FIG. 6(b) shows the relation between the slip frequency $\omega_s$ (solid line 43) delivered from the slip frequency calculation portion 134 and the actual slip frequency (dot-and-dash line 44), while FIG. 6(c) shows the output signal 136a of the differential calculation portion 136.

As seen from FIG. 6(b), when the output signal 136a of the differential calculation portion 136 is added to the speed signal 7a, the output signal of the slip frequency calculation portion 134 (the computed value) and the actual slip frequency (the average value) come into agreement, the lag of the speed detection ascribable to the sampling control can be corrected, and the overvoltage or torque-off of the motor can be avoided. Moreover, in the mode of regenerative braking (deceleration), the problem of the prior art can be solved that the actual slip frequency becomes greater or that the current of the motor increases.

As set forth above, according to this invention, the magnitude by which the rotational speed of an induction motor changes after the output signal of a speed detector has been fed into a microcomputer until a control signal is applied to an inverter is corrected, whereupon a signal for speed control is delivered to the inverter. Therefore, the lag of speed detection attributed to sampling control can be corrected, a predetermined slip frequency at which an actual slip frequency and a computed value agree is attained during acceleration or deceleration, and the overvoltage and torque-off of the motor can be prevented.

I claim:

1. In an elevator speed control apparatus having a converter which converts alternating current into direct current, an inverter which inverts the D.C. output of the converter into alternating current to control a speed of a hoisting induction motor, a speed detector which detects the rotational speed of the induction motor, and processing means to control the A.C. output of the inverter, wherein an output signal of the speed detector is fed into the processing means at a predetermined interval, and an output signal produced by calculation of the processing means is applied to the inverter so as to perform a slip frequency control of the induction motor; a speed control apparatus for an elevator characterized by comprising means to correct a magnitude by which the rotational speed of the induction motor changes after the output signal of said speed detector has been fed into said processing means until the control signal is applied to said inverter.

2. A speed control apparatus for an elevator as defined in claim 1, wherein the correction means receives the speed detector output signal fed at the predetermined interval, differentiates it to create a differential signal and delivers the differential signal as a correction signal.

3. A speed control apparatus for an elevator as defined in claim 2, wherein said processing means comprises slip frequency output means to create and deliver a slip frequency for the slip frequency control as a signal, the output signal delivered by said correction means is added to the output signal of said output means, and the correction is performed with the resulting signal.

4. A speed control apparatus for an elevator as defined in claim 3, wherein the speed detector output signal is added to the output signal of said slip frequency output means, and the resulting signal is output as a frequency command, and the output signal of said correction means is added to the speed detector output signal, and the resulting signal is added to the output signal of said slip frequency output means.

5. A speed control apparatus for an elevator as defined in claim 4, wherein said processing means comprises first addition means to add the speed detector output signal and the output signal of said correction means; and second addition means to add the output signal of said slip frequency output means and an output signal from said first addition means.

* * * * *